(12) United States Patent
Powers

(10) Patent No.: US 7,872,881 B2
(45) Date of Patent: Jan. 18, 2011

(54) SECONDARY REGULATION IN A MULTIPLE OUTPUT FLYBACK TOPOLOGY

(75) Inventor: Randall L. Powers, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1000 days.

(21) Appl. No.: 11/205,725

(22) Filed: Aug. 17, 2005

(65) Prior Publication Data

US 2007/0041226 A1 Feb. 22, 2007

(51) Int. Cl.
H02M 3/335 (2006.01)
H02H 7/125 (2006.01)

(52) U.S. Cl. .................. 363/21.12; 363/21.17; 363/97; 363/56.1

(58) Field of Classification Search ............... 363/21.12, 363/21.16, 21.17, 56.01, 56.1, 97
See application file for complete search history.

(56) References Cited

U.S. PATENT DOCUMENTS

| | | | |
|---|---|---|---|
| 4,754,385 A | 6/1988 | McDade et al. | |
| 5,745,359 A * | 4/1998 | Faulk | 363/95 |
| 5,757,627 A * | 5/1998 | Faulk | 363/21.14 |
| 5,768,118 A * | 6/1998 | Faulk et al. | 363/72 |
| 6,038,150 A * | 3/2000 | Yee et al. | 363/89 |
| 6,058,030 A | 5/2000 | Hawkes et al. | |
| 6,078,509 A * | 6/2000 | Jacobs et al. | 363/21.18 |
| 6,252,784 B1 * | 6/2001 | Dobrenko | 363/21.12 |
| 6,385,058 B1 * | 5/2002 | O'Meara | 363/21.01 |
| 6,426,886 B1 * | 7/2002 | Goder | 363/56.1 |
| 6,462,965 B1 | 10/2002 | Uesono | |
| 6,606,257 B2 * | 8/2003 | Bourdillon | 363/21.12 |
| 6,735,094 B2 * | 5/2004 | Steigerwald et al. | 363/17 |
| 6,788,555 B2 * | 9/2004 | Bourdillon et al. | 363/21.14 |
| 6,987,676 B2 | 1/2006 | Cheng et al. | |
| 6,998,964 B2 | 2/2006 | Lomax, Jr. et al. | |
| 2003/0048648 A1 | 3/2003 | Lin et al. | |

* cited by examiner

Primary Examiner—Bao Q Vu
(74) Attorney, Agent, or Firm—Fogg & Powers LLC

(57) ABSTRACT

In one embodiment, a power supply includes a flyback transformer having a primary winding and at least two secondary windings. An output voltage is developed across a first one of the secondary windings. The power supply includes a transistor coupled to the first one of the secondary windings. The output voltage is regulated about a nominal output voltage by operating the transistor in a linear mode when current is flowing through the first one of the secondary windings and by operating the transistor in an off mode when current is not flowing through the first one of the secondary windings.

35 Claims, 2 Drawing Sheets

SECONDARY REGULATION IN A MULTIPLE OUTPUT FLYBACK TOPOLOGY

TECHNICAL FIELD

The following description relates to power supplies in general and to power supplies having multiple voltage outputs in particular.

BACKGROUND

One approach to producing multiple voltage outputs from a single power supply cascades a series of voltage output circuits together. The overall efficiency of the power supply decreases with the addition of each cascaded voltage output circuit. Another approach to producing multiple voltage outputs from a single power supply is to use a power supply having flyback topology. In a power supply having a flyback topology, generally only one voltage output can be regulated to provide the desired nominal output voltage.

One technique for regulating additional output voltages of a power supply having a flyback topology makes use of a linear regulator. Typically, the linear regulator compares the output voltage to a reference voltage that is indicative of the desired nominal output voltage and uses the difference between the output voltage and the reference voltage to change the resistance of a variable resistor, which changes the output voltage. The variable resistor is typically implemented using a transistor, which when used this way, dissipates a large amount of heat. The loss of heat typically reduces the efficiency of the power supply considerably.

SUMMARY

In one embodiment, a power supply comprises a flyback transformer comprising a primary winding and at least two secondary windings. An output voltage is developed across a first one of the secondary windings. The power supply comprises a transistor coupled to the first one of the secondary windings. The output voltage is regulated about a nominal output voltage by operating the transistor in a linear mode when current is flowing through the first one of the secondary windings and by operating the transistor in an off mode when current is not flowing through the first one of the secondary windings.

In another embodiment, a network element comprises a transceiver that sends and receives data over a communication medium and a power supply. The power supply comprises a flyback transformer comprising a primary winding and at least two secondary windings. An output voltage is developed across a first one of the secondary windings. The power supply further comprises a transistor coupled to the first one of secondary windings. The output voltage is regulated about a nominal output voltage by operating the transistor in a linear mode when current is flowing through the first one of secondary windings and by operating the transistor in an off mode when current is not flowing through the first one of secondary windings.

DRAWINGS

DETAILED DESCRIPTION

Figure 1:
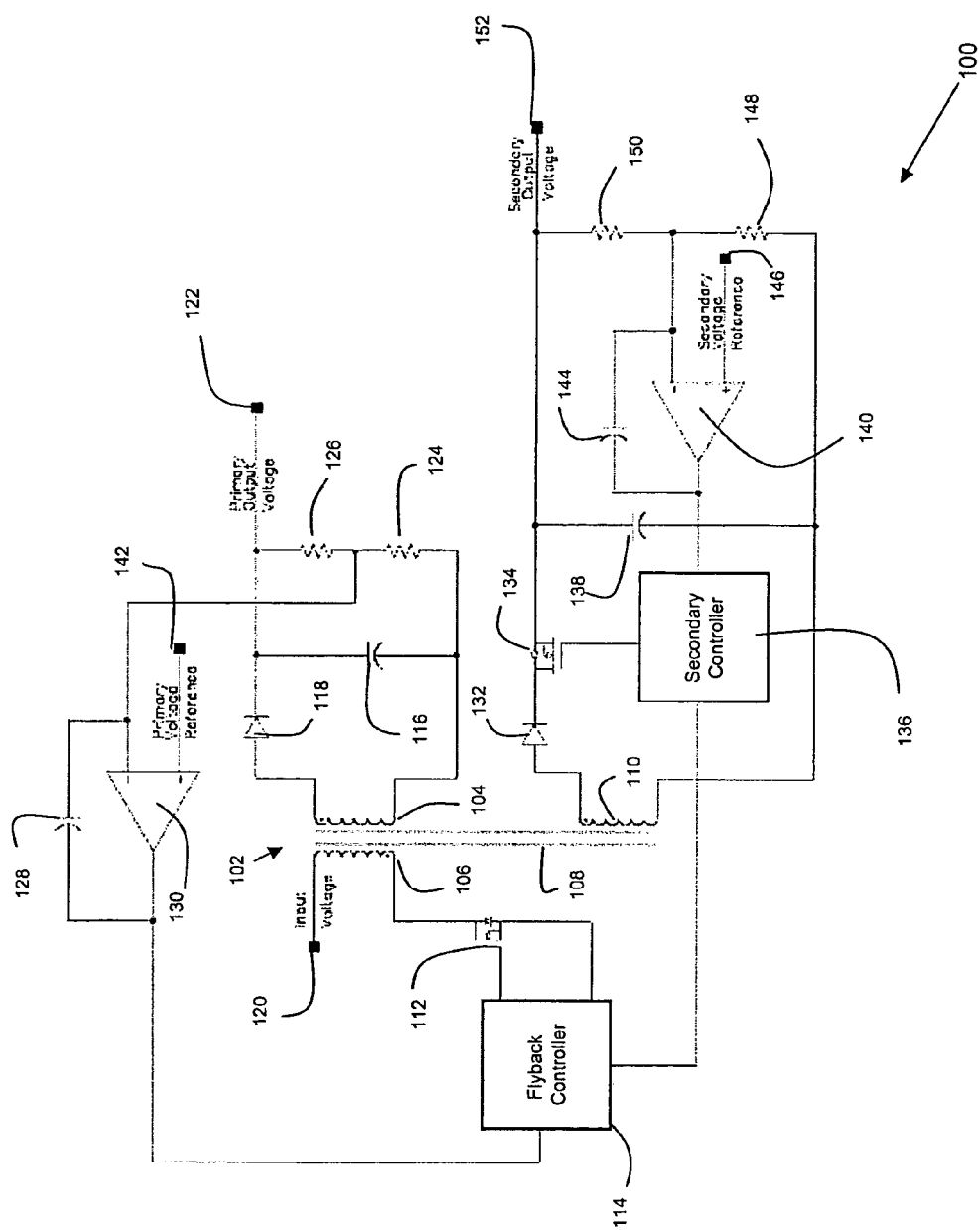
FIG. 1 is a circuit diagram of one embodiment of a power supply having a flyback topology and a transistor that operates between the linear and off regions.

FIG. 1 is a circuit diagram of one embodiment of a power supply 100 having a flyback topology that produces multiple voltage outputs. In the embodiment shown in FIG. 1, power supply 100 includes a flyback transformer 102. The flyback transformer 102 includes a primary winding 106, a core 108, a first secondary winding 104 and a second secondary winding 110. An input voltage 120 is applied across the primary winding 106 of the flyback transformer 102 when a switch 112 is closed. In the particular embodiment shown in FIG. 1, the switch 112 is implemented using a power metal oxide semiconductor field-effect transistor (MOSFET). The switch 112 is "closed" when the transistor used to implement the switch 112 is turned on and the switch 112 is "open" when the transistor is turned off.

The power supply 100 includes a flyback controller 114 that is used to turn the switch 112 on and off in order to allow the input current to flow through the primary winding 106 of the flyback transformer 102. In one implementation of such an embodiment, the flyback controller 114 is implemented using a pulse width modulation (PWM) controller and the flyback controller 114 is also referred to here as a "PWM controller" 114. The PWM controller 114 turns the switch 112 on and off in order to control a primary output voltage 122, and output current generated by the power supply 100. The duty cycle of the PWM controller 114 is increased in order to increase the primary output voltage 122. The duty cycle of the PWM controller 114 is decreased in order to decrease the primary output voltage 122 of power supply 100. The voltage developed across the second secondary winding 110, loosely tracks the voltage developed across the first secondary winding 104. The cross coupling of these two windings is degraded by losses and inefficiencies in the flyback transformer. Typically the voltage developed by an unregulated secondary output is poor and unsuitable for powering sensitive loads.

A primary output capacitor 116 is connected across the first secondary winding 104 of the flyback transformer 102 using a primary flyback diode 118. The primary output voltage 122 is developed across the primary output capacitor 116. When the PWM controller 114 turns the switch 112 on, the primary flyback diode 118 is not conducting and energy is stored in the core 108 of the flyback transformer 102. When the PWM controller 114 turns the switch 112 off (thereby stopping the input current from flowing through the primary winding 106), the primary flyback diode 118 turns on and the energy stored in the core 108 of the flyback transformer 102 charges the primary output capacitor 116 and provides load current. During the time the primary diode 118 is off, load current for the primary output voltage 122 is supplied exclusively by the primary capacitor 116.

The power supply 100 comprises a primary error amplifier 130 that outputs a signal that is indicative of the difference between the primary output voltage 122 and a nominal primary output voltage. The output of the primary error amplifier 130 is used by the PWM controller 114 to control the duty cycle of the switch 112. The non-inverting input to the primary error amplifier 130 is coupled to a primary reference voltage 142 that is indicative of the nominal primary output voltage. A voltage that is indicative of the primary output voltage 122 is developed between a pair of bias resistors 124 and 126 and is coupled to the inverting input of the primary error amplifier 130. The resistors are used to scale the voltage output 122 to the level the primary reference voltage 142. A capacitor 128 is coupled between the inverting input of the primary error amplifier 130 and the output of the primary error amplifier 130 in order to provide control stability. The output of the primary error amplifier 130 is used by the PWM controller 114 to adjust the primary output voltage 122 of the power supply (by adjusting the duty cycle of the switch 112). In this way, the primary output voltage 122 is regulated in order to output the nominal primary output voltage, regardless of changes in load current.

A secondary output capacitor 138 is connected across the second secondary winding 110 of the flyback transformer 102 using a secondary flyback diode 132. The secondary output voltage 152 is developed across the secondary output capacitor 138. When the PWM controller 114 turns the switch 112 on, the secondary flyback diode 132 is not conducting and energy is stored in the core 108 of the flyback transformer 102. When the PWM controller 114 turns the switch 112 off (thereby stopping the input current from flowing through the primary winding 106), the secondary flyback diode 132 turns on and the energy stored in the core 108 of the flyback transformer 102 charges the secondary output capacitor 138 and provides load current. During the time the secondary flyback diode 132 is off, load current for the secondary output voltage 152 is supplied exclusively by the secondary capacitor 138.

The power supply 100 comprises a secondary controller 136 that is used to regulate the secondary output voltage 152 output by the power supply 100. The secondary controller 136 regulates the secondary output voltage 152 via a voltage applied to the gate of a transistor 134. In the particular embodiment shown in FIG. 1, the transistor 134 is implemented using a power MOSFET. The secondary controller 136 is communicatively coupled to the PWM controller 114 so that the secondary controller 136 is able to determine when the secondary flyback diode 132 is conducting. When the secondary flyback diode 132 is not conducting, the secondary controller 136 applies an input voltage to the transistor 134 (that is, the voltage applied to the gate of the transistor 134) so that the transistor 134 turns off. When the secondary flyback diode 132 is conducting, the secondary controller 136 applies an input voltage to the transistor 134 that cause the transistor 134 to operate in the linear region. When the transistor 134 is operating in the linear region, the output current of the transistor 134 varies linearly with respect to the input voltage applied to the transistor 134 by the secondary controller 136. The input voltage applied to the transistor 134 by the secondary controller 136 while the secondary flyback diode 132 is conducting is indicative of the difference between the secondary output voltage 152 and a nominal secondary output voltage.

The power supply 100 comprises a secondary error amplifier 140 that outputs a signal that is indicative of the difference between the secondary output voltage 152 and the secondary reference voltage 146. A voltage that is indicative of the secondary output voltage 152 is developed between a pair of bias resistors 148 and 150 and is coupled to the inverting input of the secondary error amplifier 140. The resistors are used to scale the secondary voltage output 152 to the level the secondary reference voltage 146. A capacitor 144 is coupled between the inverting input of the secondary error amplifier 140 and the output of the secondary error amplifier 140 in order to provide control stability. The output of the secondary error amplifier 140 is used by the secondary controller 136 to adjust input voltage that is applied to the transistor 134 while the secondary flyback diode 132 is conducting (that is, while the transistor 134 is operating in the linear region), which adjusts the secondary output voltage 152. In this way, the secondary output voltage 152 is regulated in order to output the nominal secondary output voltage, regardless of changes in load current. In other words, the transistor 134 operates like a linear regulator (that is, like a variable resistor) when the secondary flyback diode 132 is conducting. However, by switching the transistor 134 into the off mode while the secondary flyback diode 132 is not conducting, the amount of heat dissipated by the transistor 134 is reduced, which increases the efficiency of the power supply 100.

The various components of the power supply 100 can be implemented using appropriate discrete components and/or with components that integrate various components of the power supply 100. For example, in one implementation, the PWM controller 114 and the switch 112 are implemented in a single integrated circuit device.

Embodiments of the power supply 100 described here can be used in various devices and systems. One exemplary embodiment is shown in FIG. 2.

Figure 2:
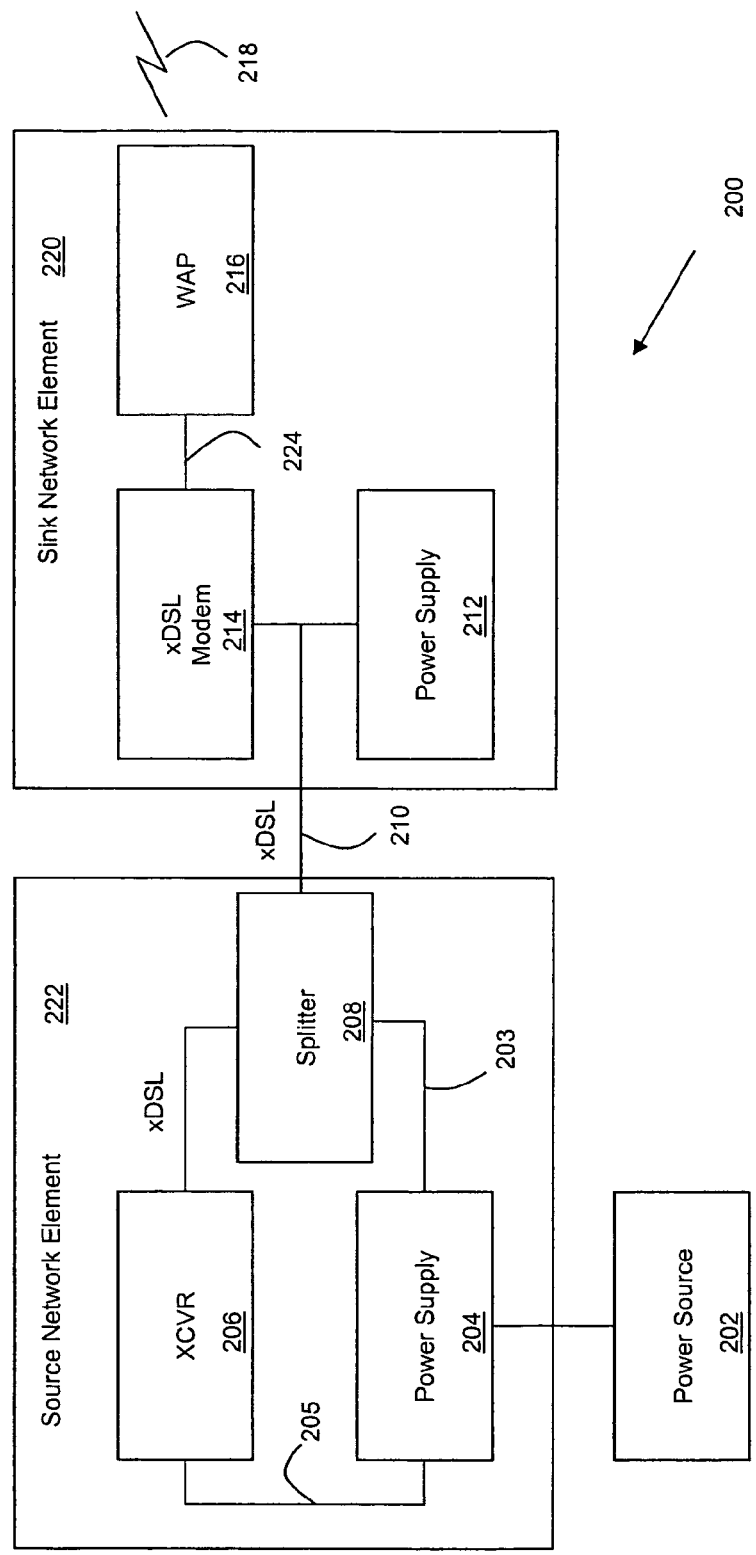
FIG. 2 is a block diagram of one embodiment of a network that includes at least one line-powered network element.

FIG. 2 is a block diagram of one embodiment of a network 200 that includes at least one line-powered network element. Network 200 includes at least one network element 222 (referred to here as a "source network element") that provides power to at least one other network element 220 (referred to here as a "sink network element") over a communication medium 210. In one implementation, the communication medium 210 is also used to establish a communication link (for example, a digital subscriber line (DSL) communication link) between the source network element 222 and the sink network element 220. In other implementations, a communication medium (or media) other than the communication medium 210 used for line powering is used to establish one or more communication links between the source network element 222 and the sink network element 220.

In the embodiment shown in FIG. 2, the source network element 222 comprises a power supply 204 having a flyback topology in which a secondary output voltage is regulated using a transistor that is switched between an off mode and a linear mode. In one implementation of such an embodiment, the power supply 204 comprises an embodiment of the power supply 100 shown FIG. 1. The power supply 204 is coupled to a power source 202 that provides the input voltage for the power supply 204. In one implementation, the power source 202 includes a direct current (DC) and/or an alternating current (AC) power source such as a battery and/or a connection to the main power grid.

The power supply 204 outputs a primary output voltage 203 and a secondary output voltage 205. Power output by the power supply 204 via the primary output voltage 203 is applied to the communication medium 210 through a splitter 208. The sink network element 220 extracts the line power from the communication medium 210 and uses the extracted line power to power the sink network element 220. Power output by the power supply 204 via the secondary output voltage 205 is used to power one or more components used to implement a transceiver unit 206. Transceiver unit 206 sends and receives data to and from the sink network element 220 over the communication medium 210. The transceiver unit 206 is communicatively coupled to the communication medium 210 via the splitter 208. In alternate embodiments, power supply 204 is used to power other components of the source network element 222 via the primary output voltage 203 and/or the secondary output voltage 205.

In the particular embodiment shown in FIG. 2, the source network element 222 comprises a central office network element located in a central office of a service provider and is also referred to here as the "central office network element 222." The sink network element 220 comprises a remote network element located in the outside plant (for example, in an environmentally hardened enclosure) and is also referred to here as the "remote network element 220." In such an embodiment, a DSL link is provided between the central office network element 222 and the remote network element 220 over the communication medium 210. The DSL link is provided over the same communication medium that line power is provided to the remote network element 220. The reference "xDSL" is also used herein to refer any suitable DSL link (or related technology). Examples of suitable xDSL links include a DSL link conforming to the International Telecommunication Union (ITU) standard G.991.2 (a "G.SHDSL" link), a high-bit rate DSL (HDSL) link, a high-bit rate digital subscriber line 2 (HDSL2) link, a high-bit rate digital subscriber line 4 (HDSL4) link, or an asymmetric digital subscriber line (ADSL) link). In other embodiments, other types of communication links are used.

The remote network element 220 is powered by the communication medium 210 that is coupled between the central office network element 222 and the remote network element 224. The remote network element 220 includes a power supply 212 that is coupled to the communication medium 210. The power supply 212 extracts the power supplied on the communication medium 210 by the power supply 204. The extracted power is used to power the various components of the remote network element 220.

The remote network element 220 also includes an xDSL modem 214 that modulates and demodulates the xDSL signals carried over the communication medium 210. The modem 214 is coupled to a wireless access point 216 over an ETHERNET connection 224. The wireless access point 216 transmits traffic to, and receives traffic from, various wireless devices (not shown) over at least one wireless link 218. Examples of wireless devices include computers or personal digital assistants having wireless transceivers. In one embodiment, the wireless access point 216 is a wireless access point that supports the Institute for Electrical and Electronics Engineers (IEEE) 802.11b standard (also referred to as "WI-FI"), 802.11a, 802.11g, HomeRF, or any other appropriate wireless communication standard. In other embodiments, a remote network element 220 includes an external ETHERNET port (in addition to or instead of the wireless access point 216) that could be used to couple the subscriber interface of the xDSL modem 214 to a local area network over a wired connection.

In operation, wireless traffic is received by the wireless access point 216 from various wireless devices. The wireless traffic is transmitted to the central office network element 222 by the xDSL modem 214 over the communication medium 210. The splitter 208 receives the xDSL traffic transmitted by the modem 214 and provides the received traffic to the transceiver unit 206. The traffic is forwarded, if appropriate, to an appropriate upstream network. In the downstream direction, traffic intended for the remote network element 220 is received by the transceiver unit 206 from an upstream network. The splitter 208 receives the xDSL traffic from the transceiver unit 206, combines the received xDSL traffic with the line power output by the power supply 204, and outputs the combined signal onto the communication medium 210. The remote network element 220 receives the combined signal from the communication medium 210. The power supply 212 of the remote network element 220 extracts the power supplied on the communication medium 210 for powering the remote network element 220. The xDSL modem 214 of the remote network element 220 extracts the traffic from the communication medium 210 and outputs the traffic to the wireless access point 216 over the ETHERNET connection 224. The wireless access point 216 transmits the traffic over the wireless communication link 218 to appropriate wireless devices.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A power supply comprising:
a flyback transformer comprising a primary winding and at least two secondary windings, wherein an output voltage is developed across a first one of the secondary windings;
a transistor coupled to the first one of the secondary windings;
wherein the output voltage is regulated about a nominal output voltage by operating the transistor in a linear mode when current is flowing through the first one of the secondary windings and by operating the transistor in an off mode when current is not flowing through the first one of the secondary windings.

2. The power supply of claim 1:
wherein the transistor comprises an input voltage terminal;
wherein, while current is not flowing through the first one of the secondary windings, a first input voltage is applied to the input voltage terminal of the transistor in order to operate the transistor in the off mode;
wherein, while current is flowing through the first one of the secondary windings, a voltage is applied to the input voltage terminal of the transistor in order to operate the transistor in the linear mode;
wherein, while the transistor is operated in the linear mode, a current flowing through the transistor is proportional to the voltage applied to the input voltage terminal of the transistor; and
wherein the voltage applied to the input voltage terminal of the transistor is indicative of the difference between the output voltage and the nominal reference voltage.

3. The power supply of claim 1,
wherein a primary output voltage is developed across a second one of the secondary windings and a secondary output voltage is developed across the first one of the secondary windings.

4. The power supply of claim 1, further comprising:
a flyback controller communicatively coupled to the flyback transformer to control when current flows through the first one of the secondary windings; and
an output controller communicatively coupled to the transistor and the flyback transformer to control when the transistor operates in the off mode and when the transistor operates in the linear mode.

5. The power supply of claim 1, further comprising a comparator comprising:
a first input that is indicative of the output voltage;
a second input that is indicative of the reference voltage; and
an output that is indicative of a difference between the first input and the second input.

6. The power supply of claim 1, further comprising a capacitor coupled across the first one of the secondary windings.

7. The power supply of claim 1, further comprising a diode coupled to the first one of the secondary windings.

8. The power supply of claim 5, wherein the comparator is an amplifier.

9. The power supply of claim 1, wherein the transistor is a MOSFET.

10. A power supply comprising:
a flyback transformer comprising a primary winding and at least a first secondary winding across which a primary output voltage is developed and a second secondary winding across which a secondary output voltage is developed;
a transistor coupled to the second secondary winding, wherein the transistor is operated in an off mode while current is not flowing through the second secondary winding and is operated in a linear mode while current is flowing through the second secondary winding;
wherein an input voltage applied to the transistor while the transistor is operating in the linear mode is a function of the output of a difference between the secondary output voltage and a nominal secondary reference voltage.

11. The power supply of claim 10, further comprising:
a flyback controller communicatively coupled to the flyback transformer to control when current flows through the first secondary winding and the second secondary winding; and
an output controller communicatively coupled to the transistor and the flyback transformer to control when the transistor operates in the off mode and when the transistor operates in the linear mode.

12. The power supply of claim 10, further comprising a comparator comprising:
a first input that is indicative of the secondary output voltage;
a second input that is indicative of the nominal reference voltage; and
an output that is indicative of a difference between the secondary output voltage and the nominal reference voltage.

13. The power supply of claim 10, further comprising a capacitor coupled across the second secondary winding.

14. The power supply of claim 10, further comprising a diode coupled to the second secondary winding.

15. The power supply of claim 12, wherein the comparator is an amplifier.

16. The power supply of claim 10, wherein the transistor is a MOSFET.

17. A network element comprising:
a transceiver that sends and receives data over a communication medium;
a power supply comprising:
a flyback transformer comprising a primary winding and at least two secondary windings, wherein an output voltage is developed across a first one of the secondary windings;
a transistor coupled to the first one of secondary windings;
wherein the output voltage is regulated about a nominal output voltage by operating the transistor in a linear mode when current is flowing through the first one of secondary windings and by operating the transistor in an off mode when current is not flowing through the first one of secondary windings.

18. The network element of claim 17:
wherein a primary output voltage is developed across a second one of the secondary windings and a secondary output voltage is developed across the first one of the secondary windings.

19. The network element of claim 18, wherein the secondary output voltage is used to supply power to the transceiver.

20. The network element of claim 18, wherein the primary output voltage is applied to the communication medium to power a sink network element coupled to the network element via the communication medium.

21. The network element of claim 20, further comprising a splitter that combines data transmitted by the transceiver and the power output by the power supply in order to generate a combined signal, wherein the combined signal is applied to the communication medium.

22. A system comprising:
a source network element; and
a sink network element coupled to the source network element;
wherein the source network element comprises a source power supply, the source power supply comprising:
a flyback transformer comprising a primary winding and at least two secondary windings, wherein an output voltage is developed across a first one of the secondary windings;
a transistor coupled to the first one of the secondary windings;
wherein the output voltage is regulated about a nominal output voltage by operating the transistor in a linear mode when current is flowing through the first one of the secondary windings and by operating the transistor in an off mode when current is not flowing through the first one of the secondary windings;
wherein the source network element combines data intended for the sink network element and a power output by the source power supply in order to generate a combined signal, wherein the source network element applies the combined signal to a communication medium;
wherein the sink network element comprises a sink power supply that extracts the power from the communication medium to power the sink network element.

23. The system of claim 22, wherein the data intended for the sink network element comprises digital subscriber line data.

24. The system of claim 23, wherein the digital subscriber line data comprises at least one of HDSL, HDSL2, HDSL4, ADSL, and G.SHDSL data.

25. The system of claim 22, wherein the source network element further comprises a splitter that combines the data intended for the sink network element and the power output by the source power supply in order to generate the combined signal.

26. The system of claim 22, wherein the sink network element further comprises a wireless access point.

27. The system of claim 22, wherein the sink network element further comprises a modem.

28. The system of claim 22, wherein the source network element further comprises a transceiver that sends and receives data over the communication medium.

29. The system of claim 28:
wherein a primary output voltage is developed across a second one of the secondary windings and a secondary output voltage is developed across the first one of the secondary windings.

30. The system of claim 29, wherein the secondary output voltage is used to supply power to the transceiver.

31. The system of claim 29, wherein the primary output voltage is applied to the communication medium to power the sink network element coupled to the source network element via the communication medium.

32. A method of regulating an output voltage output by a power supply comprising a flyback transformer having a primary winding and a second winding across which the output voltage is developed, the method comprising:

determining when current is flowing through the secondary winding;

when current is flowing through the secondary winding, operating a transistor coupled to the secondary winding in a linear mode; and when current is not flowing through the secondary winding, operating the transistor in an off mode.

33. The method of claim 32, further comprising increasing the output voltage by increasing the duty cycle of a flyback controller coupled to the flyback transformer.

34. The method of claim 32, further comprising decreasing the output voltage by decreasing the duty cycle of a flyback controller coupled to the flyback transformer 35. A power supply comprising:

a flyback transformer having a primary winding and a secondary winding across which the output voltage is developed;

a transistor coupled to the secondary winding;

means for determining when current is flowing through the secondary winding;

means for operating the transistor in a linear mode when current is flowing through the secondary winding; and means for operating the transistor in an off mode when current is not flowing through the secondary winding.

* * * * *